May 22, 1962 G. A. JOHNSON 3,035,435
PRESSURE TESTER
Filed Sept. 16, 1959 2 Sheets-Sheet 1

INVENTOR.
GLEN A. JOHNSON
BY Harold B. Hood
ATTORNEY

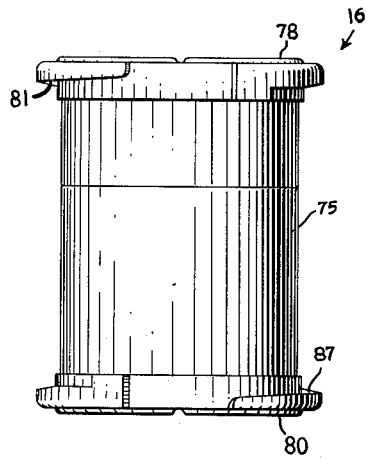
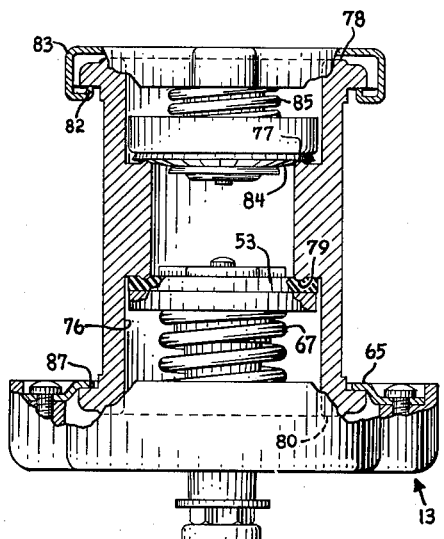
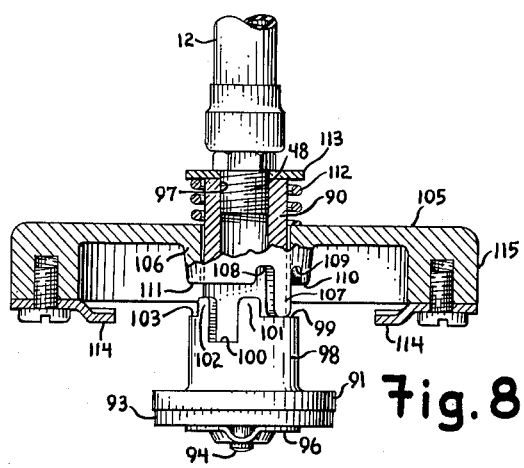
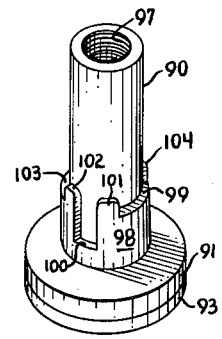
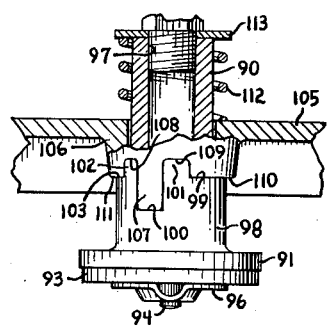

United States Patent Office 3,035,435
Patented May 22, 1962

3,035,435
PRESSURE TESTER
Glen A. Johnson, Connersville, Ind., assignor to Stant Manufacturing Company, Inc., Connersville, Ind., a corporation of Indiana
Filed Sept. 16, 1959, Ser. No. 840,444
5 Claims. (Cl. 73—40)

The present invention relates to a pressure tester and is primarily concerned with the provision of an improved assembly for use in testing the fluid tightness of closed vessels or systems, the pressures under which valved systems will react to relieve pressure and the effectiveness and proper calibration of closure caps for pressure systems.

The tester of the present disclosure has been designed primarily for use in connection with pressure type automobile engine cooling systems and the caps therefor; and it has been illustrated, and will be described, in that environment although it will be apparent to those skilled in the art that the tester may find uses in other environments.

Several different kinds of pressurized cooling systems, designed for operation under various pressure levels, are currently in use in the automobiles of various manufacture in this country; and each of them includes a radiator having a filler neck formed to provide a lip for securing engagement by an element of the cap and a closure seat axially spaced from that lip. The cap designed for use with any one of these systems conventionally includes a resiliently mounted valve element pressed against such seat, under yielding spring pressure, when the cap is so engaged with the filler neck. Ideally, the spring which so presses the valve against such seat is calibrated to hold the valve in sealing engagement with its seat so long as the pressure within the system does not exceed a predetermined value, but to yield whenever the pressure exceeds that value to prevent the accumulation of excessive pressure within the system. Since the cooling efficiency of any such system is optimum when the system is operated under the pressure for which that system is designed, it is obvious that, if the cap spring becomes weakened or if the valve for any other reason permits the escape of pressure, the efficiency of the system will be lowered. Obviously, even minor leaks in such a pressurized system may be very important.

Thus, it is known that such systems should be frequently tested for leakage and that the caps for such systems, which, in effect, act as safety valves, should be frequently tested for leakage and for proper pressure calibration.

The tester of the present disclosure is designed for convenient, effective and accurate use with any conventional automobile cooling system and with the caps designed for use with such systems. The primary objects of the invention are to improve the efficiency and accuracy of the tester, to facilitate its construction and maintenance in use and to facilitate its application to, and use with, cooling systems and caps of various constructions.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 6 is an elevation of an adapter designed for use with the tester of the present invention;

FIG. 7 is a section through such an adapter, showing the attachment assembly of the tester and a closure cap operatively assembled therewith;

FIG. 8 is an elevation of a modified form of attachment assembly, partly in section;

FIG. 9 is a perspective view of an element of the assembly of FIG. 8; and

FIG. 10 is a fragmental view partly in section, showing the attachment assembly of FIG. 8 with its parts in a different position of adjustment.

Figure 1:
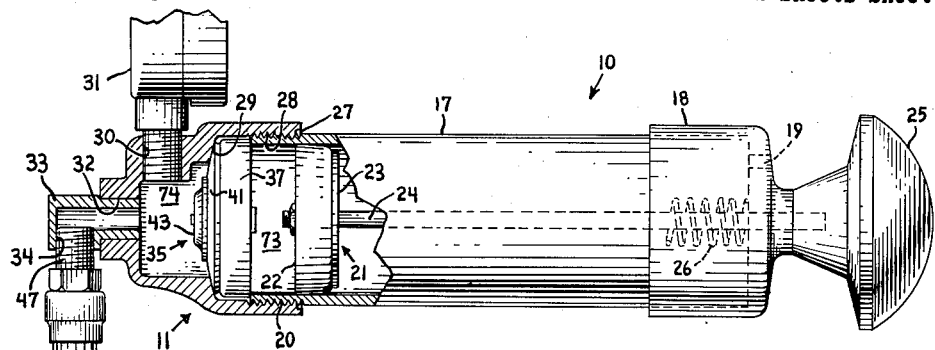
FIG. 1 is an elevation of a tester constructed in accordance with the present invention, in operative association with a fragment of a conventional automobile radiator filler neck, parts being broken away and parts being shown in section for clarity of illustration.
Figure 3:
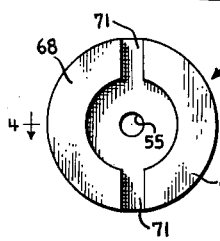
FIG. 3 is an enlarged bottom plan view of a baffle plate preferably used in the attachment assembly of the present tester.
Figure 4:
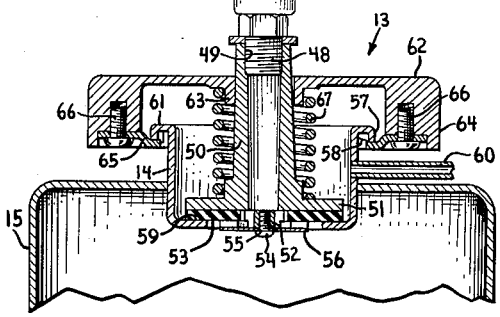
FIG. 4 is a section taken substantially on the line 4—4 of FIG. 3.
Figure 4:
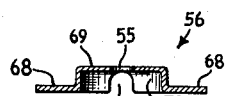
Figure 2:
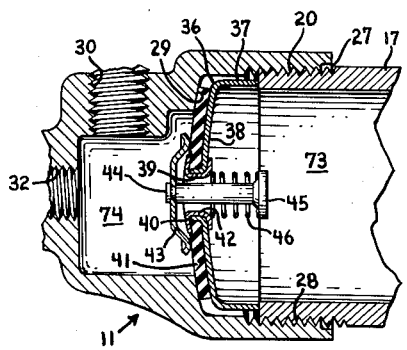
FIG. 2 is an enlarged fragmental section showing an optimum form of valved partition dividing the pump chamber from the accumulator chamber of the tester illustrated in FIG. 1.
Figure 5:
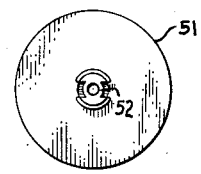
FIG. 5 is a bottom plan view of the stem element of the attachment assembly shown in FIG. 1.

Referring more particularly to FIGS. 1 to 5, it will be seen that my tester comprises a pump indicated generally by the reference numeral 10, an accumulator fitting indicated generally by the reference numeral 11, a flexible conduit 12 and an attachment unit or assembly indicated generally by the reference numeral 13. The assembly 13 is constructed and arranged for cooperative attachment to the filler neck 14 of a conventional automobile radiator 15, and is also associable, in a manner and for a purpose later to be described, with either end of an adapter fitting indicated generally by the reference numeral 16 (FIGS. 6 and 7).

The pump 10 comprises a cylindrical tubular body member 17 one end of which is semi-permanently closed by a cap 18 formed with an inlet port 19. The other end of the cylinder is externally threaded as at 20 for a purpose which will appear. Reciprocably mounted in the cylinder is a piston, indicated generally by the reference numeral 21, and comprising a flexible sealing cup 22 of conventional form backed by a rigid plate 23 and fixedly secured to a piston rod 24 which projects through an appropriate opening in the cap 18 and carries an operating handle 25 exteriorly of the cylinder. Preferably, though not necessarily, a spring 26 is positioned within the cylinder to cushion retractive movement of the piston.

The accumulator fitting 11 is formed with an open mouth 27 proportioned and designed to receive the open end of the cylinder 17, said fitting being interiorly threaded as at 28 for reception of the threads 20 on the cylinder end. An internal shoulder 29 within the fitting 11 concentrically faces the open mouth 27 of the fitting for a purpose which will appear. The fitting is further provided with a threaded port 30 for the reception of the stem of a conventional pressure gauge 31, and with a further port 32 for the reception of an elbow 33 having a threaded exhaust or discharge port 34.

A valved partition, indicated generally by the reference numeral 35, is freely received in the fitting 11 and preferably comprises a rigid cup 36 formed to define a peripheral rim 37, whose diameter is somewhat less than the diameter of the mouth 27, and a base 38 which is centrally perforated at 39, said perforation being bounded by an axially-inturned lip 40. An annular gasket 41 is externally sleeved on the lip 40 and is suitably secured to the cup 36, with the opening through the gasket in registry with the port 39, by any suitable means such as, for instance, the hollow rivet 42. A valve 43 spans the registering openings through the cup base and the gasket and is supported upon a stem 44 which penetrates those openings and terminates in a head 45, a spring 46 being confined between said head and the rivet 42 to hold the valve 43 resiliently in sealing engagement with the gasket 41. The gasket 41 is so proportioned and designed that, when the partition 35 is in place in the fitting 11, said gasket may sealingly engage the shoulder 29. The cup 36 is so designed that, when the cylinder 17 is threaded into the fitting mouth 27, the end of the cylinder will engage the cup rim 37 to press the gasket 41 tightly against the shoulder 29. Thereby, of course, the assembly 35 is constituted a partition between the pump chamber 73 and the accumulator chamber 74. Obviously, as the piston 21 is moved toward the left, air will be forced through the port 39, overcoming the tendency of the spring 46 and moving the valve 43 away from the gasket 41; but the spring 46 will hold the valve in closing association with the port at all times except when the pressure in the chamber 73 exceeds the pressure in the chamber 74.

Whenever the assembly 35 becomes worn or damaged, as it inevitably will in use, it may be replaced as a unit by merely disconnecting the cylinder 17 from the fitting 11, withdrawing and discarding one unit 35, replacing it with a new unit, and reseating the cylinder in the fitting mouth 27. Advantageously, the assembly 35 may be the valve assembly of a conventional pressure-vacuum radiator closure cap.

The exhaust port 34 of the elbow 33 is proportioned and designed for the threaded reception of a nipple 47 at one end of the flexible conduit 12 which may be a piece of rubber hose. A similar nipple 48 at the other end of the hose is designed to be threadedly received in one end 49 of a tubular stem 50 having an enlarged head 51 at its opposite end. As shown, a spider 52 integrally spans the passage through the stem 50, projecting beyond the distal face of the head 51 to center an annular gasket 53 which is adapted to bear against such distal head surface. A screw 54 penetrates a perforation 55 in a baffle plate 56 and enters a threaded central bore in the spider 52 to secure the gasket 53 and the plate 56 in place on the stem 50.

Conventionally, the filler neck 14 of an automobile radiator 15 is formed to provide at its outermost end a lip 57 defining diametrically-opposite, peripheral cam surfaces 58, and such a neck also provides a seat 59 axially spaced from the lip 57. An overflow pipe 60 usually communicates with the neck 14 between a seat 61 at the outermost end of the neck, and the seat 59.

A cap-like element 62 is mounted on the stem 50 for rotational and axial adjustment relative thereto and comprises a hub portion 63 closely surrounding the stem and a rim portion 64 radially spaced from the stem. Fingers 65, 65 are secured to the rim portion 64 by means of screws 66, or other suitable fastening means, at diametrically spaced points for cooperative engagement with the cammed surfaces 58 of the lip 57. The parts are so proportioned and designed that, when the gasket 53 is seated on the seat 59, the fingers 65 may be engaged with said cam surfaces 58 so secure the element 62 to the filler neck 14, thereby, through a coiled spring 67 confined between the element 62 and the head 51, pressing the gasket 53 into sealing engagement with the seat 59. Now, when the piston 21 is actuated, air will be pumped into the vehicle cooling system and will be prevented from escape therefrom by the engagement of the gasket 53 with the seat 59, so that pressure of any desired value can be built up in the cooling system, the pressure being readable on the gauge 31.

It is desirable, of course, to prevent liquid in the system from splashing into the tubular stem 50, and therefore I prefer to use the baffle plate 56 as means for securing the gasket 53 to the head 51. As is most clearly illustrated in FIGS. 3 and 4, said plate is formed to define rim portions 68 which lie in a common plane and are pressed, by the screw 54, against the outer surface of the gasket 53. A central, raised portion 69 defines a chamber 70 which is in open communication with the interior of the tubular stem through the spider ports; and raised tunnel or channel portions 71, communicating with the chamber 70 and extending radially therefrom, direct air supplied through the hose 12 substantially horizontally into the radiator 15, instead of permitting jets of air to be directed against the surface of liquid in the radiator.

The adapter 16 (FIGS. 6 and 7) comprises a cylindrical body 75 formed with an open passage 76 therethrough, said passage being interrupted by a seat 77 facing one end 78 of the adapter and by a seat 79 facing the opposite end 80 of the adapter. The seat 77 is axially spaced from the adapter end 78 by a distance which is equivalent to the distance between the seat 59 and the seat 61 of one conventional form of automobile radiator filler neck, while the seat 79 is axially spaced from the adapter end 80 by a distance which is substantially equal to the distance between the inner and outer seats of another conventional form of filler neck. These two filler neck forms are known in the trade as "short neck" and "long neck" radiators; and separate cap forms, suitably dimensioned, are conventionally supplied for cooperation with such separate neck forms. In FIG. 7, I have shown a "short neck" type of conventional cap, assembled with the adapter 16 and with the attachment assembly 13, in position to be tested. Cam surfaces 81 are provided on the body 75 adjacent the adapter end 78 to be engaged by the fingers 82 of such a conventional cap 83; and the parts are so proportioned and arranged that, when the cap is turned down on the adapter end 78, the gasket 84 of the cap 83 will be resiliently pressed against the seat 77 by the cap spring 85. It will be apparent that the association of the gasket 84 with the seat 77 will be in all respects analogous to the association of that gasket with the internal filler neck seat when the same cap is mounted on a short neck radiator.

The opposite end of the adapter is provided with similar cam surfaces 87; and the fingers 65 of the attachment assembly 13 may be engaged with those cam surfaces to assemble the tester with the capped adapter. When so assembled, the gasket 53 will be pressed against the seat 79 by the spring 67. Now, if the piston 21 is actuated, air will be pumped into the space between the seats 77 and 79 to create a pressure which may be directly read on the gauge 31. If the cap 83 is a "7-pound" cap, the piston will be actuated until the gauge 31 shows an accumulation of 7 pounds pressure within the adapter; and if the gauge does not fall, when operation of the piston is discontinued, it will have been demonstrated that the cap spring 85 has not become so weakened, and the gasket 84 has not become so worn or damaged, as to render the cap unsatisfactory for use. If, however, the pressure does fall, it will have been demonstrated that the cap 83 should be discarded.

If the pressure does not fall, the piston 21 will be further actuated to pump more air into the adapter. If the pressure gauge 31 continues to rise to a value substantially above 7 pounds before the gasket 84 is forced off its seat, it will have been demonstrated that the cap 83 is not the proper cap for use in a 7 pound pressurized cooling system; and that cap should be discarded, since its continued use in a 7 pound system would be dangerous.

If a "long neck" cap is to be tested, of course, the assembly 13 will be mounted on the end 78 of the body 75, and the cap to be tested will be mounted on the end 80 thereof. Since the spring 67 must necessarily be quite heavy, it has been found that it is difficult to mount the assembly 13 on the end 78 of the body 75 or on a "short neck" type of radiator, since the spring 67 must be quite substantially compressed in that operation. To obviate that difficulty, I have devised a modified form of attachment assembly which is illustrated in FIGS. 8, 9 and 10.

In the latter form of assembly, a hollow stem 90 is formed to provide an enlarged head 91 and a gasket 93 is supported on the distal face of that head through the medium of a baffle plate 96 and a screw 94 taking into a spider carried by that head, like the baffle plate 56, screw 54 and spider 52 of FIGS. 1 to 5. The opposite end of the stem is internally threaded as at 97 for reception of the nipple 48.

Adjacent the head 91, the stem 90 is formed with an enlarged section 98 formed to define a first abutment surface 99 and a second abutment surface 100 facing toward the first-named end of the stem. The surfaces 99 and 100 are angularly spaced from each other and a barrier element 101, projecting toward the upper end of the stem, is interposed between said surfaces. Preferably, but not necessarily, the section 98 further affords a surface 103 coplanar with the surface 99 and a barrier 102 like the barrier 101 is interposed between the surfaces 100 and 103; and a further abutment surface (not shown) coplanar with the surface 100 will be provided at a point diametrically spaced from the surface 100 with barriers, only one of which, 104, is illustrated, interposed between said coplanar surface and the surfaces 99 and 103.

A cap-like element 105 is rotationally and axially adjustably mounted on the stem 90 and includes a hub portion 106 which closely surrounds the stem and a rim portion 115 radially spaced from the stem and carrying fingers 114 like the fingers 65.

The hub portion 106 is formed to provide an axially extending finger 107 which is adapted selectively to bear upon the abutment surface 99 or upon the abutment surface 100. The finger 107 is flanked by sockets 108 and 109 which, when the finger bears upon the surface 100, will receive the barriers 102 and 101, respectively. Preferably, but not necessarily, the hub portion 106 defines abutment surfaces 110 and 111 which rest, respectively, upon the surfaces 99 and 103 when the finger 107 bears upon the surface 100. If the section 98 is symmetrical, as above described, a finger similar to the finger 107 and flanked by sockets similar to the sockets 108 and 109, will be provided at a position diametrically opposite the position of the finger 107.

A light spring 112 will preferably be confined between the member 105 and a washer 113 to hold the parts against rattling.

The parts are so proportioned and designed that, when the finger 107 bears against the abutment surface 99, and when the fingers 114 are engaged with the cam surfaces 87 of the adapter 16, the gasket 93 will be firmly pressed against the shoulder 79; and when the finger 107 bears against the abutment surface 100, engagement of the fingers 114 with the cam surfaces 81 of the adapter 16 will press the gasket 93 firmly against the shoulder 77.

I claim as my invention:

1. In a pressure testing device for a closed system having a neck formed to provide a lip and an internal seat axially spaced from said lip, with an overflow vent between said lip and said seat, the combination of a pump cylinder defining a pump chamber, a piston reciprocable in said pump chamber, a fitting defining an accumulator chamber and formed to receive an end of said cylinder, a partition removably received in said fitting between said accumulator chamber and said cylinder end and retainingly engaged by said cylinder end, said partition dividing said pump chamber from said accumulator chamber and being ported, valve means carried by said partition and yieldably biased to a position closing communication through said ported partition between said chambers but responsive to an excess of pressure in said pump chamber over that in said accumulator chamber to open such communication, said fitting being formed to provide a discharge port communicating with said accumulator chamber, a flexible conduit supported from said fitting with one end in open communication with said discharge port, and an attachment unit comprising a hollow stem having one end supported from the other end of said conduit, annular gasket means at the other end of said stem, a cap element loosely mounted on said stem and provided with means engageable with said lip to secure said cap element releasably to said neck, and means for transmitting force from said cap element to said stem in the direction of said internal seat.

2. In a pressure testing device for a closed system having a neck formed to provide a lip and an internal seat axially spaced from said lip, with an overflow vent between said lip and said seat, the combination of a pump cylinder defining a pump chamber, a piston reciprocable in said pump chamber, a fitting defining an accumulator chamber and formed to receive an end of said cylinder, a partition removably received in said fitting between said accumulator chamber and said cylinder end and retainingly engaged by said cylinder end, said partition dividing said pump chamber from said accumulator chamber and being ported, valve means carried by said partition and yieldably biased to a position closing communication through said ported partition between said chambers but responsive to an excess of pressure in said pump chamber over that in said accumulator chamber to open such communication, said fitting being formed to provide a discharge port communicating with said accumulator chamber, a flexible conduit supported from said fitting with one end in open communication with said discharge port, and an attachment unit comprising a hollow stem having one end supported from the other end of said conduit, annular gasket means at the other end of said stem, a cap element loosely mounted on said stem, and spring means resiliently resisting movement of said cap element toward said other end of said stem, said cap element being provided with means engageable with said lip and said parts being so constructed and arranged that, when said gasket means bears on said seat, engagement of said last-named means with said lip will compress said spring means.

3. In a pressure testing device for a closed system having a neck formed to provide a lip and an internal seat axially spaced from said lip, with an overflow vent between said lip and said seat, the combination of a pump cylinder open and externally threaded at one end to define a pump chamber, a piston reciprocably mounted in said chamber and having a piston rod projecting through the opposite end of said cylinder and carrying a handle outside said cylinder, a fitting defining an accumulator chamber and having an interiorly threaded mouth for the reception of said threaded cylinder end, said fitting being formed with an internal shoulder coaxial with said mouth and facing toward said mouth, a cup-shaped partition having an opening through its base, a gasket exteriorly supported on said base and having an opening registering with the opening in said base, said partition being located in said fitting with its gasket engaging said shoulder and its rim disposed for engagement by said threaded cylinder end so that said cylinder presses said gasket into fluid-sealing engagement with said shoulder, check valve means carried by said partition and yieldably urged into engagement with said gasket to close the openings through said gasket and partition against fluid flow from said accumulator chamber into said pump chamber, said fitting being formed to provide a discharge port communicating with said accumulator chamber, a flexible conduit supported from said fitting with one end in open communication with said discharge port, and an attachment unit comprising a hollow stem having one end supported from the other end of said conduit, annular gasket means at the other end of said stem, a cap element loosely mounted on said stem, and spring means resiliently resisting movement of said cap element toward said other end of said stem, said cap element being provided with means engageable with said lip and said parts being so constructed and arranged that, when said gasket means bears on said seat, engagement of said last-named means with said lip will compress said spring means.

4. In combination, a pump cylinder open and externally threaded at one end to define a pump chamber, a piston reciprocably mounted in said chamber and having a piston rod projecting through the opposite end of said cylinder and carrying a handle outside said cylinder, a fitting defining an accumulator chamber and having an interiorly threaded mouth for the reception of said threaded cylinder end, said fitting being formed with an internal shoulder coaxial with said mouth and facing toward said mouth, a cup-shaped partition having an opening through its base, a gasket exteriorly supported on said base and having an opening registering with the opening in said base, said partition being located in said fitting with its gasket engaging said shoulder and its rim disposed for engagement by said threaded cylinder end so that said cylinder presses said gasket into fluid-sealing engagement with said shoulder, check valve means carried by said partition and yieldably urged into engagement with said gasket to close the openings through said gasket and partition against fluid flow from said accumulator chamber into said pump chamber, said fitting being formed to provide a discharge port communicating with said accumulator chamber.

5. In combination, a pump cylinder open and externally threaded at one end to define a pump chamber, a piston reciprocably mounted in said chamber and proportioned and arranged to force fluid toward said one end of said chamber upon reciprocation of said piston, a fitting formed to define an accumulator chamber, said fitting having an internally threaded mouth for threaded reception of said threaded cylinder end, an outwardly-facing, internal annular shoulder in said fitting substantially coaxial with said mouth, a rigid cup-shaped member having a central port in its base, an annular gasket concentrically seated exteriorly on said base, a valve having a head proportioned and arranged to seat on said gasket in spanning relation to the registering openings through said gasket and said member, said valve further having a stem penetrating said openings and terminating in an enlarged head, and a coiled spring sleeved on said stem and confined between said stem head and said member, said cup-shaped member being received in said fitting with said gasket facing said shoulder and with the rim of said member disposed for engagement by said threaded cylinder and, said fitting, said member and said cylinder being so proportioned and designed that, as said cylinder end is threaded into said fitting mouth, it will engage the rim of said cup-shaped member to press said gasket into fluid-sealing engagement with said shoulder to constitute said cup-shaped member a valved partition dividing said pump chamber from said accumulator chamber for one-way fluid flow from said pump chamber to said accumulator chamber, said fitting further being provided with a discharge port communicating with said accumulator chamber.

References Cited in the file of this patent

UNITED STATES PATENTS

| | | |
|---|---|---|
| 532,985 | McLean | Jan. 22, 1895 |
| 1,337,132 | Harpst | Apr. 13, 1920 |
| 1,478,485 | Morse | Dec. 25, 1923 |
| 2,446,219 | Eaton | Aug. 3, 1948 |
| 2,547,106 | Zachiariassen | Apr. 3, 1951 |
| 2,588,987 | Roberts | Mar. 11, 1952 |
| 2,625,033 | Adair | Jan. 13, 1953 |
| 2,760,367 | Stromberg | Aug. 28, 1956 |
| 2,847,851 | Enell | Aug. 19, 1958 |
| 2,916,307 | Peters | Dec. 8, 1959 |
| 2,940,301 | Hughes | June 14, 1960 |